June 25, 1929.　　　P. M. MUELLER　　　1,718,480
PRECISION THREADING LATHE
Filed July 9, 1926　　　2 Sheets-Sheet 1
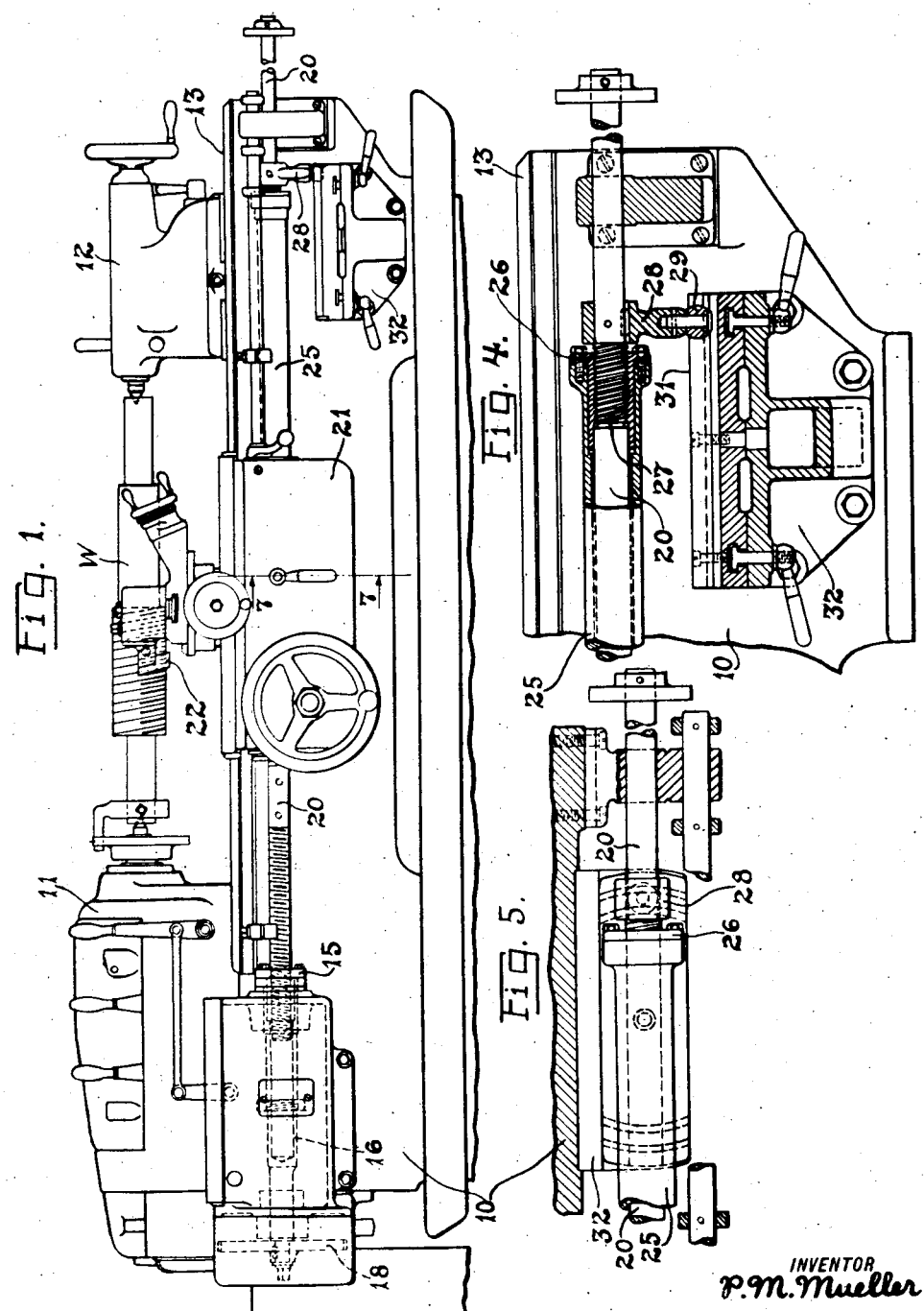

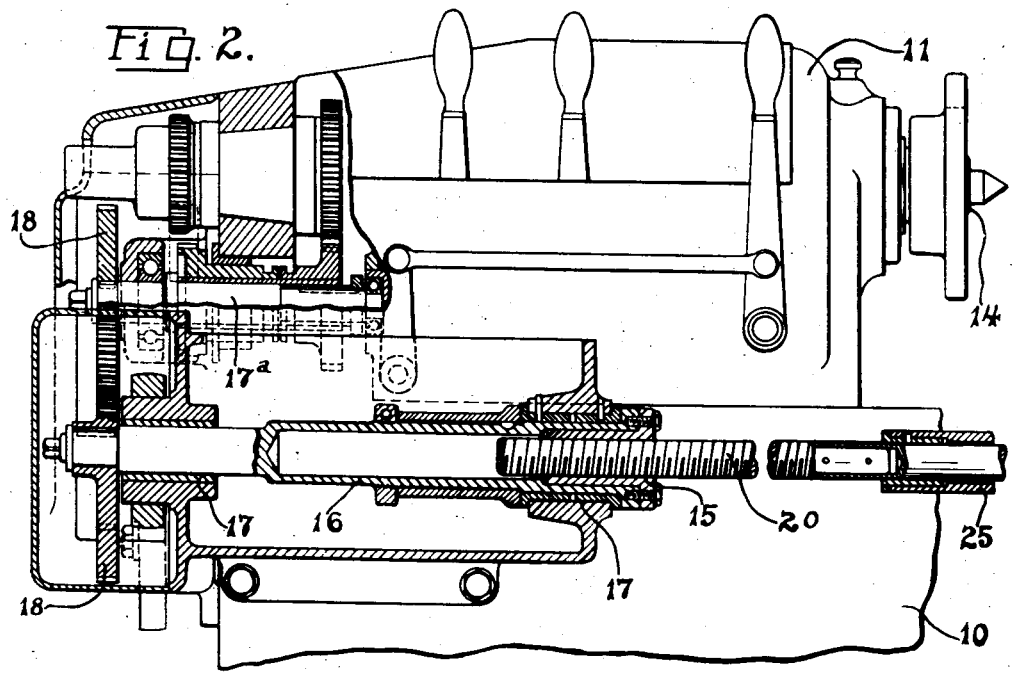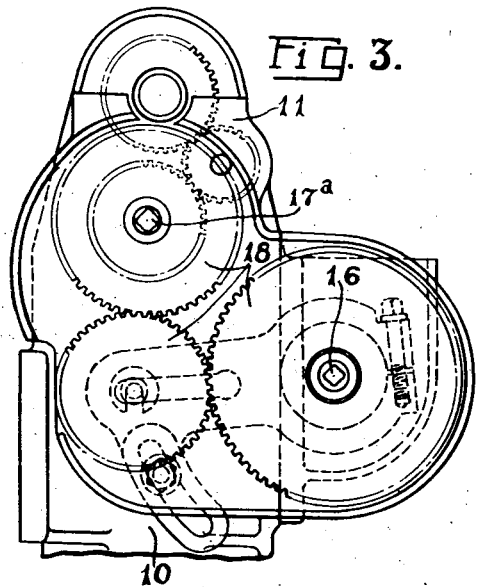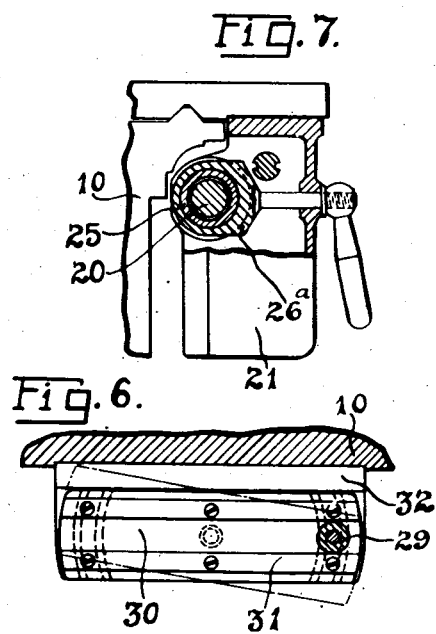

Patented June 25, 1929.

1,718,480

UNITED STATES PATENT OFFICE.

PAUL M. MUELLER, OF HARTFORD, CONNECTICUT, ASSIGNOR TO PRATT & WHITNEY COMPANY, OF NEW YORK, N. Y., A CORPORATION OF NEW JERSEY.

PRECISION-THREADING LATHE.

Application filed July 9, 1926. Serial No. 121,382.

This invention relates to lathes and particularly to a lathe adapted for precision threading operations.

An object of the present invention is to provide a lathe with special means for performing screw threading operations whereby the lead of the work threaded my be cut to a very high degree of precision.

Another object of the invention is to provide a lead screw for a lathe the threaded portion of which is materially shorter than the length of the bed of the lathe so that in performing threading operations substantially the same portions of the threads may be used with the tool carriage adjusted to any position along the bed for different lengths of or positions of the threads on the work.

Another object of the invention is to provide a lead compensating device for screw threading lathes so that the lead of the work threaded may be formed slightly greater or slightly less than that determined by the lead of the threads on the lead screw and the driving connections for the lead screw from the work rotating spindle.

Another object of the invention is to provide a lead screw having threaded portions at one end engaging a rotatable nut in the lathe headstock and a sleeve rotatably mounted thereon and preferably secured thereto by threads at the opposite end of the lead screw of a different lead and of opposite hand than the lead of the threads on the lead screw, and also to provide clamping means for the tool carriage securing it to the sleeve at any desired point along the sleeve.

Another object of the invention is to provide a rotatable nut driven from connections extending from the work spindle for effecting longitudinal movements of the tool in timed relation to the rotation of the work and to provide means for slightly rotating the lead screw during the axial movements of the carriage.

With these and other objects in view, my invention consists in the features of construction and operation set forth in the following specification and illustrated in the accompanying drawings.

In the accompanying drawings annexed hereto and forming a part of this specification, I have shown my invention embodied in an engine lathe but it will be understood that the invention can be otherwise embodied and that the drawings are not to be construed as defining or limiting the scope of the invention, the claims appended to this specification being relied upon for that purpose.

In the drawings:

Figure 1 is a front elevation of a complete machine provided with the present invention.

Fig. 2 is an enlarged view in front elevation of the headstock of the lathe and adjacent parts, parts being broken away to more clearly disclose the construction.

Fig. 3 is an end elevation of the machine taken from the left-hand end of Fig. 2.

Fig. 4 is a front elevation of the tailstock end of the lathe partially broken away to show the parts thereof in section.

Fig. 5 is a plan view of the lead compensating mechanism at the tailstock end of the lathe.

Fig. 6 is a plan view of the adjustable compensating member, and

Fig. 7 is a cross sectional view of the clamping mechanism taken substantially along line 7—7 of Fig. 1.

In the above mentioned drawings I have shown but one embodiment of the invention which is now deemed preferable, but it is to be understood that changes and modifications may be made within the scope of the appended claims without departing from the spirit of the invention.

Briefly and in its broadest aspect, my invention comprises the following principal parts: First, a base; second, a headstock having work supporting and rotating means thereon; third, a tool supporting carriage slidably mounted along the base; fourth, a threaded member rotatably mounted adjacent the headstock and adapted to be held against axial movement; fifth, means for rotating this member in predetermined timed relation to the work supporting and rotating means; sixth, a cooperating threaded member engaging said first mentioned threaded member and extending along the base; seventh, a sleeve rotatably mounted upon the cooperating threaded member and threadedly connected thereto; eighth, an angularly adjustable plate mounted adjacent the tailstock; ninth, an arm on said cooperating threaded member adapted to engage a slot in said angularly adjustable plate; and tenth, means to clamp the tool support to said sleeve in any position of the carriage.

Referring more in detail to the figures of the drawings, I provide a base 10 having a headstock 11 fixed thereon at one end and a tailstock 12 adjustably mounted along suitable ways 13 formed on said base 10. Within the headstock 11 is a work supporting and rotating member preferably in the form of a spindle 14 which may be rotated at a number of different speeds by any desirable or conventional means (not shown).

Mounted adjacent the headstock 11 on the base 10 is a rotatable threaded member 15. In the present embodiment of the invention this member is in the form of a nut preferably fixedly secured, as shown clearly in Fig. 2, to an elongated member 16 rotatably mounted within suitable bearings 17 and maintained against axial movement. In order to rotate this latter member 16, change gears 18 are provided extending from one of the intermediate driving shafts 17$^a$ for the work supporting and rotating spindle 14 so that this elongated member 16 and its threaded member 15 may be rotated in timed relation to the work rotating spindle 14. It will be understood that these change gears 18 may be of any predetermined ratios in order to enable the nut 15 to be rotated in different predetermined relation to the rotative movement of the spindle 14.

Adapted to engage the threaded portions of the nut 15 is a lead screw 20 which extends along the base. Normally this lead screw 20 is not rotated but is axially moved due to the rotation of the nut 15. In order to permit axial movement of this lead screw 20, the elongated member 16 is bored throughout a major portion of its length so that the lead screw 20 can enter. Adapted to engage this lead screw 20 beyond its threaded portion in a manner to be more particularly described later, is a tool carriage 21 on which may be mounted a conventional or other form of threading tool 22. It will be seen from the above mechanism that rotation of the work spindle 14 will rotate the nut 15 and thus axially move the lead screw 20 in one direction or the other and that with the tool carriage 21 clamped to the lead screw 20 threads on the work W will be formed of any predetermined lead.

The lead, however, of threads formed on the work W will reproduce any errors in the lead screw 20 and also will be limited to a relatively few leads by the possible combinations of change gears 18. In order to compensate for slight errors in the lead screw 20 and to cut threads of slightly different leads, the following mechanism is provided. Instead of clamping the tool carriage 21 directly to the lead screw 20, the lead screw 20 is surrounded by means of a sleeve 25. It is this sleeve 25 which is clamped to the tool carriage 21 during the thread cutting operations. For this purpose a binding clamp 26$^a$ is provided in the apron of the tool carriage 21. The lead screw 20 extends throughout the length of this sleeve 25 and beyond its end is attached thereto by means of a nut 26 secured within the sleeve 25 and engaging supplementary threads 27 formed on the lead screw 20. The threads 27 are preferably of the opposite hand from those in engagement with the nut 15 in order to increase the compensating or varying effect of the threading mechanism. Also mounted on the lead screw 20 and keyed thereto in fixed relation is a short arm 28 having a roller 29 at its outer end.

This roller 29 on the arm 28 is adapted to engage within a slot 30 formed in an angularly adjustable plate 31 adapted to be secured in adjusted position to a bracket 32 adjacent the tailstock end of the base 10. It will therefore be seen from this construction that during the axial movement of the lead screw 20 together with the sleeve 25 clamped to the tool carriage 21 the lead screw 20 will be slightly rotated within the revolving nut 15 dependent upon the angular adjustment of the plate 31 carrying the slot 30. The effect of this rotation of the lead screw 20 will be to axially vary the position of the sleeve 25 and tool carriage 21 due to the threads on the nut 15, this axial movement or displacement taking place during the operative movements of the carriage 21.

The compensating or supplementary screw threads 27 connecting the lead screw 20 with the sleeve 25 will further axially displace the sleeve 25 and carriage 21, this supplementary displacement also taking place uniformly throughout the operative movements of the carriage 21. By suitably adjusting the plate 31 the resultant leads produced by the lead screw 20 and compensating or supplementary screw threads 27 and angular plate 31 may be of any desired distance and the number of different leads produced may be greatly increased over those produced by the lead screw 20 and the geared connections 18.

What I claim is:

1. A precision threading device for lathes comprising a base, work supporting and rotating means thereon, a tool carriage slidable on said base, a threaded member rotated in timed relation to the work rotating means and held in fixed axial position, a cooperating threaded member extending substantially the entire length of the lathe, said cooperating threaded member engaging said first mentioned threaded member and normally held against rotation, means connecting said tool carriage to a member threadedly connected to said cooperating threaded member, and means to slightly rotate said cooperating threaded member within said first mentioned threaded member during rotation of said first threaded member and axial movement of said carriage.

2. A precision threading device for lathes comprising a base, work supporting and rotating means thereon, a tool carriage slidable on said base, a nut rotated in timed relation to the work rotating means and held in fixed axial position, a lead screw engaging said nut and normally held against rotation, a sleeve surrounding an extended portion of said lead screw and threadedly connected thereto, means rigidly connecting said tool carriage to said sleeve, and means to slightly rotate said lead screw within said nut and sleeve during axial movement of said tool carriage.

3. A precision threading device for lathes comprising a base, work supporting and rotating means thereon, a tool carriage slidable on said base, a nut rotated in timed relation to the work rotating means and held in fixed axial position, a lead screw engaging said nut and normally held against rotation, a sleeve surrounding said lead screw, the lead screw being rotatable therein, means connecting said tool carriage to said sleeve at any point along the length of the lead screw, an angularly adjustable plate, and means engaging said plate to slightly rotate said lead screw within said nut and sleeve during axial movement of said tool carriage.

4. A precision threading device for lathes comprising in combination, a base, work supporting and rotating means thereon, a tool carriage slidable on said base, a threaded member rotated in timed relation to the work and held in fixed axial position, a cooperating threaded member engaging said first threaded member and normally held against rotation, a sleeve surrounding said cooperating threaded member and threadedly attached thereto, means to clamp said carriage to said sleeve, and means to slightly rotate the cooperating threaded member during the axial movement of the carriage.

In testimony whereof, I hereto affix my signature.

PAUL M. MUELLER.